Figure 1:
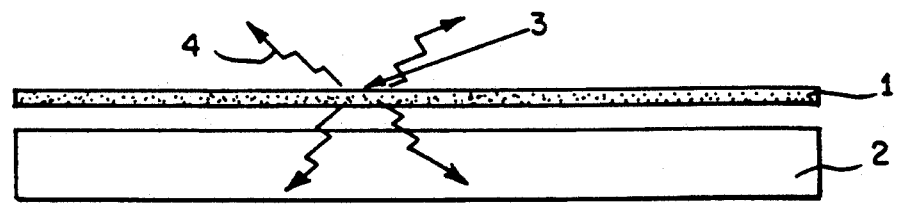

United States Patent [19]

Gravisse et al.

[11] Patent Number: 5,134,296

[45] Date of Patent: Jul. 28, 1992

[54] COUNTERMEASURE PROCESS IN THE FIELD OF TARGET EVALUATION AND LASER RANGE FINDING MATERIALS AND DEVICES FOR THE IMPLEMENTATION OF SAID COUNTERMEASURE PROCESS

[76] Inventors: Philippe Gravisse, 18-20, rue de Presles, 75015 Paris; Marc Schiffmann, Le Fromental Malataverne Mossimy, 69510 Thurins, both of France

[21] Appl. No.: 128,239

[22] Filed: Dec. 3, 1987

[30] Foreign Application Priority Data

Dec. 4, 1986 [FR] France .................. 86 16976

[51] Int. Cl.$^5$ ................ G01J 1/58; F21V 9/16
[52] U.S. Cl. ................ 250/458.1; 250/459.1; 250/341
[58] Field of Search ............ 250/340, 341, 342, 458.1, 250/459.1; 252/301.16, 301.35, 301.36

[56] References Cited

U.S. PATENT DOCUMENTS

| | | | |
|---|---|---|---|
| 3,104,478 | 9/1963 | Strauss et al. | 250/342 |
| 3,992,628 | 11/1976 | Karney | 252/582 |
| 4,088,508 | 5/1978 | Gravisse | 252/301.35 |
| 4,211,813 | 7/1980 | Gravisse et al. | 252/301.33 |
| 4,262,206 | 4/1981 | Viehmann | 250/483.1 |
| 4,325,145 | 4/1982 | Corbett et al. | 250/342 |

FOREIGN PATENT DOCUMENTS 0852383 9/1970 Canada.
0161799 12/1979 Japan.

Primary Examiner—Steven Marquis
Attorney, Agent, or Firm—Barnes & Thornburg

[57] ABSTRACT

The countermeasure process in the field of target evaluation and laser range finding consists in coating at least a portion of a missile with a doped material that absorbs at least a portion of the incident laser beam and reemits a diffuse radiation in a different waveband.

The reemission wave length preferably corresponds to an absorption spectrum band of the atmosphere. A portion of the reemitted signal can be used to trigger an alarm.

This invention also covers the materials for the implementation of the countermeasure process, they are made of a matrix that is doped with photoluminescent substances. Applications: varnish, paints, canopies, helmet vizors.

4 Claims, 2 Drawing Sheets

COUNTERMEASURE PROCESS IN THE FIELD OF TARGET EVALUATION AND LASER RANGE FINDING MATERIALS AND DEVICES FOR THE IMPLEMENTATION OF SAID COUNTERMEASURE PROCESS

This invention is related to a countermeasure process in the field of target evaluation and laser range findings, and to the materials necessary for the implementation of the process.

A wide variety of weapon systems utilize a laser beam—more especially in the YAG (Neodyme) type—with a 1.06 micrometer wavelength for the acquisition of the target and its kinetic characteristics. The common basic principle is, using an illuminator, to route a laser beam of known characteristics to the target and to analyze the characteristics of the radiation reflected by said target.

The illuminator laser beam can be either continuous or pulsed. The reflected beam is analyzed according to known methods such as interferometry, Doppler's effect, or pulse time lapse measure. This measure provides the data of the target distance and, in some instances, the displacement speed and direction as well.

The above data are essential to guide a weapon such as a missile.

The illuminator can be embarked on the projectile or fixed to a weapon system that transmits data to the projectile through electromagnetic waves or wire-guiding. The target can be a surface (land/sea) or an air vehicle. In the present state of the technique, only a very limited number of countermeasures are known that can disturb the laser range finding system. So-called "lures" may be used with the purpose to reflect a signal not complying with the target characteristics. However this principle is not easily used for laser radiation and its efficiency is very restricted on account of the improvements made in the field of signal discrimination which permit one to disregard any information considered as aberrant by the weapon system.

The French patent application No. 85 09189 by the same applicant suggested that the transmission of electromagnetic radiation generated by a source in a predetermined wavelength band to be picked up by a signal detection receiver could be disturbed by the interposition of a screen that would absorb at least a portion of the radiation transmitted within said waveband.

The purpose of this invention is a countermeasure process that allows a missile to substantially reduce the radiation it reemits when it is illuminated by a laser beam illuminator and the materials necessary for the implementation of said process.

The process of the invention consists in coating at least a portion of the missile with a material that absorbs at least a portion of the laser radiation utilised for laser range finding or target evaluation, said radiation being reemitted diffusely in a different waveband.

More specifically, the process of the invention consists in coating at least a portion of the missile with a material that absorbs at least a portion of the radiation of 1. 06 micrometer, such as is currently transmitted by YAG laser illuminators, and in reemitting said radiation as a diffuse radiation of a different wavelength. The reemission radiation is neither monochromatic nor coherent. Therefore, the strength of the energy reemitted at a wavelength of 1.06 micrometer is very substantially reduced and consequently the operation of the laser range finder is severely disturbed.

According to an alternative embodiment, the absorption wavelength is set for 10.6 micrometers.

According to a preferred embodiment, the reemission wavelength is selected so as to coincide with a spectral band of absorption of the atmosphere. In fact, at ground level, the transmission spectrum of the atmosphere has "holes" caused by the absorption ranges of the atmosphere components, viz, carbon dioxide, water vapor, oxygen and ozone.

The major absorption wavebands are substantially as follows:

1.96 to 1.8 micrometer
1.45 to 1.3 micrometer
1.15 to 1.12 micrometer
0.96 to 0.93 micrometer
0.83 to 0.80 micrometer
0.76 to 0.75 micrometer In order to optimize the attenuation of the reemission radiation it is profitable to select the reemission wavelength from one of the above bands.

According to an alternative construction, a part of the radiation reemitted in view of an alarm is detected. The presence of a reemission radiation means that the missile is subjected to a laser range finding. It is therefore possible to detect the presence of said reemission signal in order to advise the craft pilot or to alter the behaviour of an automatic missile.

This invention also relates to the materials for the implementation of the countermeasure process. The material is made of an organic matrix with the addition of at least one photoluminescent material.

According to a preferred embodiment of this invention, the matrix is made of a doped resin. Said resin is deposited onto the missile by a coating process, as a paint or a varnish. The type of resin is selected according to the type of unit and its utilization conditions. As non-restrictive examples, we may mention the following resins: polyurethanes, acrylics polyvinyl acetates, silicones, formyl-ureas and polymethylmethacrylates. Said resins shall be preferably selected and/or treated in order to offer a low electrical conductivity in order to reduce radar's response. Alternatively they may be deposited as a film of a few tenths of millimeter thickness. Furthermore the resin shall offer the characteristics of longevity, resistance and appearance required by the environment of said unit: sea, air, water, land.

Addition or doping can be achieved according to conventional dispersion techniques of photoluminescent agents into fluid resin or to inoculation techniques. Also, doped particles may be fed to a matrix of organic resin type. Doped particles are in form of fibers which are one of the components of composite materials. When it is the case, the photoluminescent doping is fed as a dispersion to a component of a glass, mineral or organic fiber.

The photoluminescent doping is of the type with an absorption peak for a 1.06 micrometer wavelength and a reemission peak for any wavelength other than 1.06 micrometer, and preferably comprised within an absorption spectrum range of the atmosphere.

As none-restrictive examples, optically active components may be listed as follows:
4 (7 (2-phenyl 4H-1-benzothiopyran-4-ylidene) 4 bromo-3-5-trimethylene-1-3-5-heptatrienyl) 2 phenyl-1-benzothiopyrylium perchlorate.

3-3'-diethyl-9-11-15-17-dineopenthylene thiopentacarbocyanin perchlorate.

Compounds of the graphite coronene type C24 H12, or more generally polycyclic aromatic hydrocarbons.

According to an alternative form of the invention several photoluminescent compounds are utilized as a "light cascade". The principle of the "light cascade" has been covered in several patent applications by the Applicant.

One of the photoluminescent compounds whose reemission band is above provides the material with good transmission properties in the visible spectrum and reduces visible reflections and another component whose reeemission band is below the reemission band of the main photoluminescent compound permits the adaptation of the reemission waveband to the spectrum sensitiveness of a photodetector or to a band with low light transmission characteristics.

According to a particular embodiment of the invention, a detector having a photosensibility to the reemission band of said coating is placed at at least one position of the unit.

When the missile is touched by a laser beam, the I.F.-radiation is remitted by the coating diffusely, more particularly in the direction of the photosensible detector. The detection of a reemission radiation permits to make an alarm system. The detection is obtained at several positions of the missile in order to complement the alarm by an indicator of the direction of the laser illuminator.

According to another particular form of embodiment of the invention, the doped material makes a rigid canopy transparent in the visible spectrum. Such a canopy is particularly suited to an aircraft or a helicopter. The material is made of a matrix of the type polymethylmethacrylate (PMMA) or epoxy or alkyl resins, of furan copolymers or copolymers of a known type.

According to a preferred embodiment, said canopy is divided into sectors permitting the identification of the direction of the laser illuminator. In the case of the glass roof and body of a helicopter, there can be three sectors for instance, with the normal to the first sector being oriented toward the front, and the normals to the other two sectors respectively to the right and to the left of the unit. One photoactive detector at least is associated with each sector. When a laser radiation of 1.06 micrometer wavelength is routed to the unit, said radiation is absorbed by the photoluminescent material of one of said sector and it is reemitted diffusely in form of radiation of different wavelength. The reemitted radiation is detected by a photodetector that is active in the reemission waveband. The identification of the incident sector of said radiation gives the possibility to have data regarding the origin of the laser range finding radiation and therefore of the position of the illuminator. The detection of reemission radiation can give rise to a visual or audible alarm. The photodetector can be selected to be of the junction type and can be provided with a low bandpass filter centered on the reemission wavelength of the material.

The photodetector is followed by an electronic processing line that eliminates background noise. Said processing line can comprise a wavefront detector which shows the incidence of a laser pulse as well as a control system in order to eliminate the influence of the variations of ambient illumination. This control can be constructed simply by a Wheatstone bridge: one of the legs contains a junction type photodetector provided with a filter whose bandpass is centered on the reemission wave length and the other leg contains a similar photodetector with another filter that eliminates the reemission waveband.

In addition to an audible alarm, threat indicator may be provided for each sector or alternatively a vocal synthesis device can be used.

The number and shape of sectors depend on the canopy configuration.

According to another alternative, said canopy represents a detection volume. This detection volume can be in the form of a semi-sphere located on the sides of a missile or on the underside of an aircraft. Said semisphere includes identification sectors made of a doped material and each is provided with at least one photodetector.

According to an alternative embodiment, the transparent rigid doped material is made into a helmet visor. In addition to its purpose of countermeasure and alarm when said visor is provided with a photodetector, it prevents the blinding effect to the pilot or damage to the pilot's retina owing to the conversion of the incident laser beam into a radiation with a high spectral and spatial diffusion.

Figure 2:
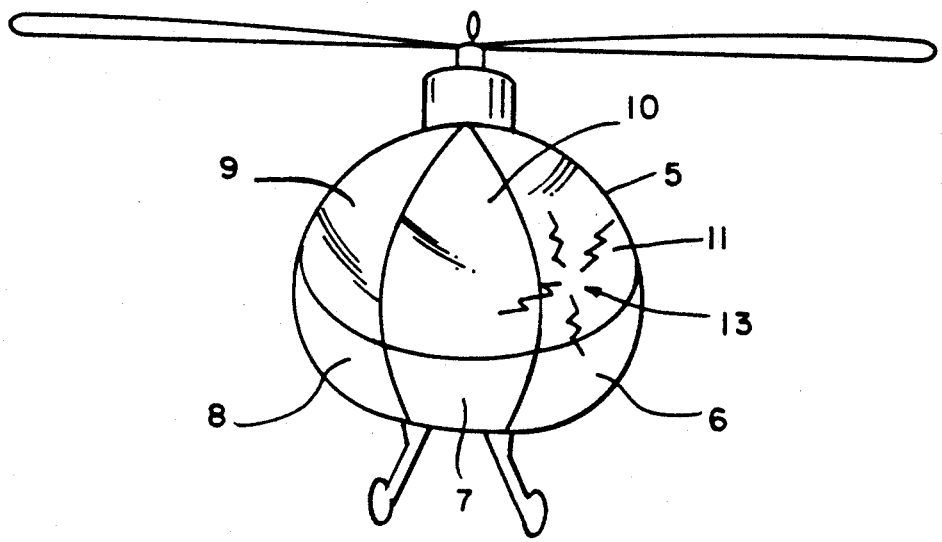
Figure 3:
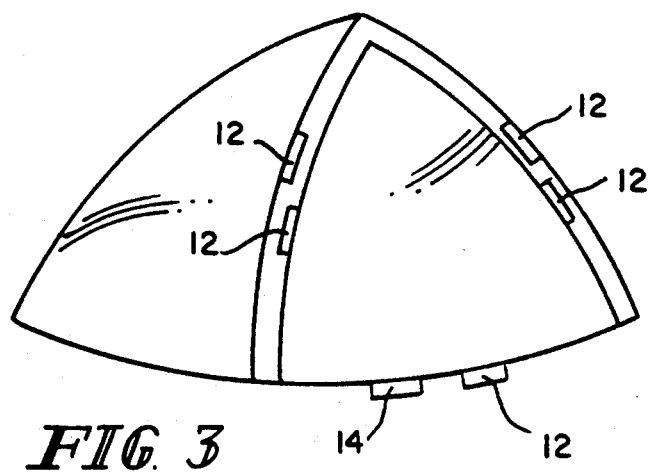
Figure 4:
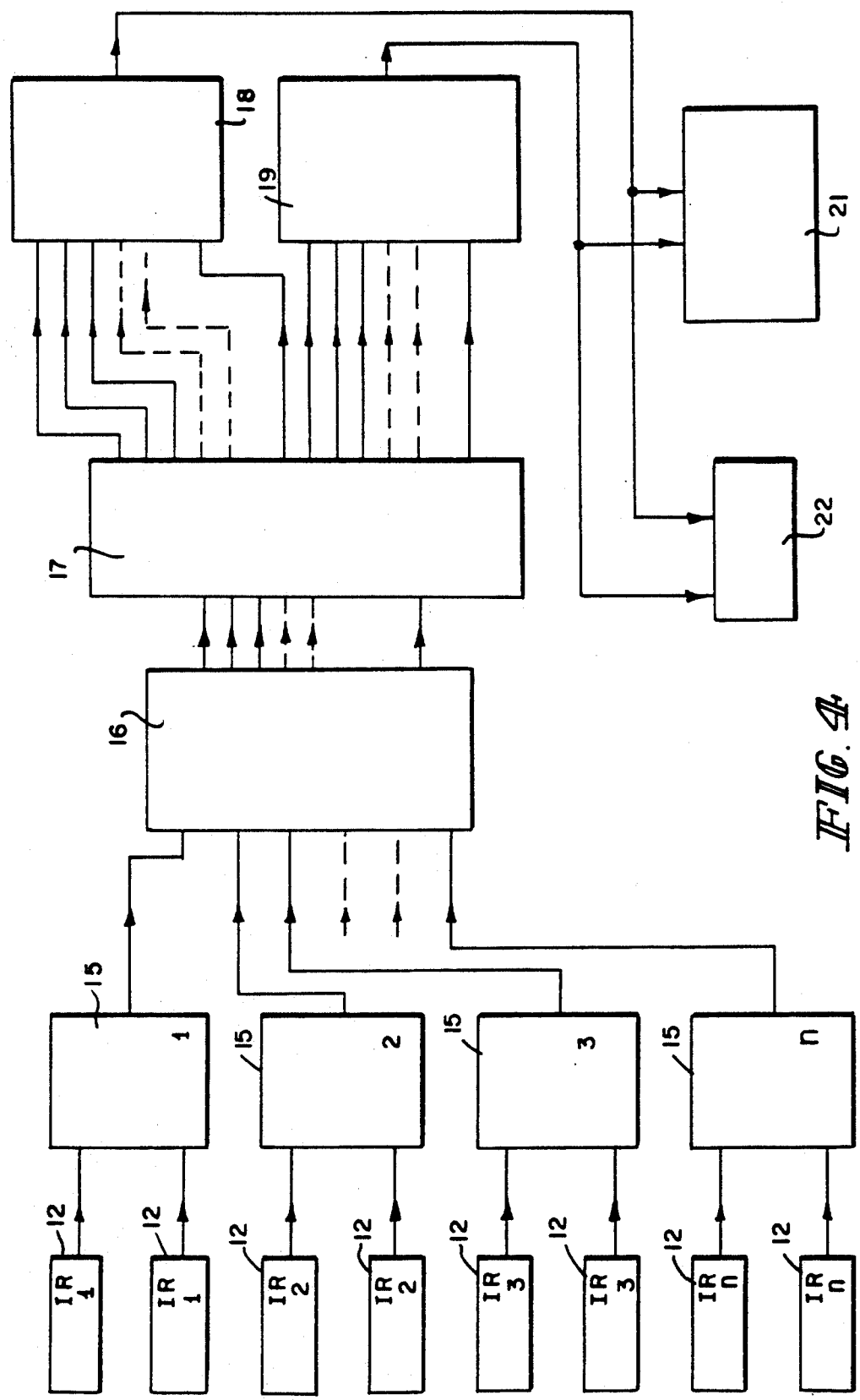

Other examples and forms of embodiment are apparent from the description given below on the strength of the figures where:

FIG. 1 is a schematic diagram of a portion of a missile according to the process of the invention, FIG. 2 is a schematic diagram of a helicopter with a canopy according to the process of the invention, FIG. 3 is a schematic diagram of a canopy fitted with a series of photodetectors in view of building an alarm system, FIG. 4 represents a block diagram of a warning system.

The doped material (1) is deposited on at least a portion of the external surface (2) of a missile, as a film of a few tenths millimeter thickness. This coating may be made by any known techniques and more particularly as a paint, varnish or adhesive film.

It is made of a resin to which photoluminescent compounds are added by mixing, inoculation or dispersion methods. The doped material (1) is optically active. It absorbs the incident beam (3) from a laser illuminator for instance. This 1.06 micrometer wavelength beam is absorbed by the doped material (1) and is reemitted in form of a diffuse radiation (4). The diffusion is both spatial and spectral, with the spectral reemission band of the doped material (1), excited by an incident radiation of a determined wavelength, appearing as a relatively narrow peak centered on a wavelength other than 1.06 micrometer. It is possible, in addition, to achieve a temporal diffusion by selecting a doped material with remanence characteristics. The remanence characteristics are provided by the photoluminescent material itself or in consequence of the addition of another photoluminescent material of high remanence.

In order to achieve a wider shift between the reemission wavelength and incident laser beam wavelength, it is possible to use one or more additional photoluminescent materials in order to obtain a light cascade. In this case, the first photoluminescent material is selected in order to absorb 1.06 micrometer radiation and to reemit a radiation of a first determined wavelength, and the second photoluminescent material is selected in order to absorb a radiation of the said first determined wavelength and to reemit a radiation of a different wavelength. The light cascades have been the subject matter of several patent applications filed by the Applicant.

According to the type of matrix and of photoluminescent materials utilized, the content by volume of photoluminescent materials varies from 0.0001 to 0.01%.

According to an alternative embodiment, the doped material is in the form of particles that can be added to one of the components of the external surfaces of the missile. They can be in the form of particles that can be added to one of the components of the external surfaces of the missile. They can be in the form of fibers intended for the production of composite materials or of flakes of varying shaped for addition to a varnish.

The matrix is made of resins with any of the following bases:
polyurethane,
acrylic,
silicone
ethyl vinyl acetate
polymethylemethacrylate
formal-urea resin
acryl vinyl copolymers
polyethylene copolymers
polyethylene-polystyryl copolymers
polymthylmethacrylate-EVA-polystyryl copolymers According to another form of embodiment, the material is configurated as a transparent canopy. The matrix is advantageously made of polymethylmethacrylate.

FIG. 2 is a diagram of a helicopter with a canopy according to the invention. The canopy (5) is transparent and can be divided in several sector (6), (7), (8), (9), (10) and (11). The individual sectors are connected together by a rigid framework of a known type.

According to a preferred method embodiment, each sector is provided with photosensitive detectors (12) located on the edges. The reemission radiation is transmitted to said photodetectors (12) by a wave guide effect. When an incident beam (13) is aimed at the missile, it is intercepted by one of the sectors. Said incident beam (13) is absorbed by the doped material the sector is made of and it is reemitted in the form of a diffuse radiation of a different wavelength, which is detected by the photoactive detectors (12) provided along said sector. The photosensitive detectors (12) are of known art and are junction type photodetectors. The photodetectors (12) are provided with a narrow bandpass filter designed to eliminate all radiation other than the radiation that corresponds to the reemission wavelength, in order to reduce background noise. The measure is by an amplifier circuit of the prior art. However, there is a possibility to further reduce the background noise that is generated essentially by hot parts of the missiles such as motors, turbines, embarked electronics or by air being heated on the fuselage of an aircraft.

For this purpose, at least another photodetector (14) is placed on the edge of each sector, featuring a different spectral sensitiveness. The aim is to cancel any variation caused by changes in ambient illumination. The photoactive detectors (12) and (14) can be fitted in the legs of a Wheatstone bridge. Said bridge is followed by a processing line whose major components are a discriminator, a wavefront detector and a visual or audible alarm. The visual indicator can be constructed as a series of light indicators such as light emitting diodes which, on a mimic panel of the missile, show which sector is illuminated by an incident beam from a laser illuminator. The visual indication can be complemented by an audible or vocal synthesis system alarm.

According to an alternative embodiment, the transparent material bearing a series of photodetectors is made into a helmet visor. In addition to the above-described functions, the visor absorbs laser radiation and prevents the blinding of the pilot or damage to his cornea.

According to an example of construction of the doped material as a semisphere for detection, for instance a body shaped as a semisphere, in view of the implementation of the process of the invention, the applicant has constructed a semisphere of composite material coated with a varnish that is composed of a PMMA matrix with addition of a photoactive component of the type 4 (7 (2-phenyl 4H-1-benzothiopyran-4-ylidene)4-bromo-3-5-trimethylene 1-3-5-heptatrienyl) 2 phenyl-1-benzothiopyrylium, with a 10% content by volume. The material has an absorption band centered on a 1.06 micrometer wavelength and a reemission band the maximum of which ranges from 1.2 to 1.115 micrometer.

The semisphere has a diameter of approximately 15 cm and is divided in four sectors of equal value. Each sector contains two photodetectors (12) the sensitiveness of which is maximum when the wavelength is 1.12 to 1.15 micrometer. The photodetectors are connected with signal processing circuits (15) aimed at eliminating background noise and spurious signals. An I.R. signal detection and shaping circuit (16) analyzes the signals that correspond to each sector and memorizes them digitally through a memory circuit (17).

The information stored in this way is analyzed by a circuit for the analysis of the threat direction (18) and by a circuit to analyze whether the displacement is approach or withdrawal (19), then the information is transmitted to the pilot as a visual indication (20) attached to the dashboard or as a data entered in the aircraft computer, also as an audible alarm by artificial voice.

According to another embodiment, a varnish is produced by dispersion of a coronene in a matrix of the EVA type, with a coronene content of $10^3$.

It is obvious that the invention is not restricted to the embodiment described here. Alterations can be made without departing from the spirit of the invention. For instance the effects according to the invention can be associated with the effects of absorbing materials of the prior art that do not contain photoluminescent addition substance.

We claim:

1. A countermeasure process in the field of target evaluation and laser range finding, characterized by coating at least a portion of a missile with a doped material which absorbs at least a portion of an incident laser radiation of a determined wavelength and reemits a diffuse radiation in a waveband that does not include said determined wavelength, wherein a portion of the radiation reemitted is detected and triggers an alarm device.

2. A countermeasure process in the field of target evaluation and laser range finding according to claim 1, wherein said doped material reemits a diffuse radiation within an absorption spectrum band of the atmosphere.

3. A countermeasure process in the field of target evaluation and laser range finding according to claim 1, wherein at least a portion of a missile is coated with a coped material that absorbs at least a portion of an incident laser radiation, with a 1.06 micrometer wavelength and further which reemits a diffuse radiation within an absorption spectrum band of the atmosphere that does not include the 1.06 micrometer wavelength.

4. A countermeasure process in the field of target evaluation and laser range finding according to claim 1, wherein at least a portion of a missile is coated with a doped material that absorbs at least a portion of an incident laser radiation with a 1.06 micrometer wavelength and which reemits a diffuse radiation within an absorption spectrum band of the atmosphere that does not include the 1.06 micrometer wavelength.

* * * * *